United States Patent Office 3,716,455
Patented Feb. 13, 1973

3,716,455
METHOD FOR PRODUCING ISOAMYLASE BY FERMENTATION
Seinosuke Ueda, Fukuoka-shi, Nobuya Nanri, Fukuoka-ken, and Motoyoshi Hongo, Fukuoka-shi, Japan, assignors to Hayashibara Co., Ltd., Okayama-shi, Japan
No Drawing. Continuation of application Ser. No. 667,345, Sept. 13, 1967. This application Aug. 1, 1968, Ser. No. 749,288
Claims priority, application Japan, Sept. 22, 1966, 41/62,328
Int. Cl. C12d *13/10*
U.S. Cl. 195—66 R            1 Claim

ABSTRACT OF THE DISCLOSURE

Production of isoamylase by fermentation of a microorganism belonging to *Escherichia intermedia* in a culturing medium at 20°–40° C. and at pH 6–9. The isoamylase is an enzyme which decomposes the $\alpha$-1,-6-linkage of starch.

CROSS-REFERENCE TO RELATED APPLICATION

This application is a continuation of application Ser. No. 667,345 filed on Sept. 13, 1967, and now abandoned.

The present invention relates to a method for producing isoamylase by fermentation which comprises producing isoamylase by culturing a strain of *Escherichia intermedia* in a culture medium containing appropriate amounts of carbohydrates, other carbon sources, nitrogen sources, inorganic substances and other nutrients necessary for microorganisms.

Isoamylase has been known as an enzyme which decomposes the $\alpha$-1,-6 linkage of starch without the addition of phosphoric acid. The production of the present enzyme by use of yeasts was reported in detail by Maruo et al. (Symposia on Enz. Chem., 1949). Moreover, Bender et al. reported that the enzyme produced by *Aerobacter aerogenes*, which decomposes polysaccharides pullulan produced by a strain of Pullularia, has properties similar to isoamylase. [H. Bender und K. Wallenfels: Biochem. Z., 334, 79–95 (1961).]

The present inventors have found that a strain of *Escherichia intermedia*, isolated from soil, accumulates isoamylase in the culture medium and have established a method for commercial production thereof.

The culture medium to be used in the present invention may be synthesized or of natural substances. It should contain carbohydrates, other carbon sources, inorganic substances and other nutrients in appropriate amounts. Any carbon source and nitrogen source which can be utilized by the present microorganisms are usable in the present culture medium. As the carbon sources, substances such as maltose, dextrin, glucose, lactose, pullulan, starch hydrolyzate, molasses and the like can be used. The concentration of carbon source is 0.5–20% of the culture medium. Moreover, if necessary, organic acids, and amino acids are added thereto, and if they are used, their concentrations are 0.1–0.5% of the culture medium. As for nitrogen sources, nitrates, or inorganic and organic ammonium salts such as ammonia, ammonium chloride, ammonium phosphate, ammonium nitrate, ammonium carbonate, ammonium acetate, etc., nitrogenous organic substances such as urea, peptone, NZ-amine, meat extract, yeast extract, cornsteep liquor, casein hydrolyzate, fish meal or its digestion substances, wheat bran, rice bran, defatted soybean dreg or its digestion substances, chrysalis hydrolyzate and the like, amino acids such as glycine, glutamic acid, aspartic acid, alanine and the like are usable. As for inorganic substances, salts such as potassium hydrogenphosphate, dipotassium hydrogenphosphate, magnesium sulfate, calcium carbonate and the like are usable.

Concentrations of these nitrogen sources and inorganic substances in the culture medium are, for example, as follows:

| | Percent | | Percent |
|---|---|---|---|
| Peptone | 1 | Milk casein extract | 1 |
| Yeast extract | 0.5 | $K_2HPO_4$ | 0.1 |
| $K_2HPO_4$ | 0.1 | KCl | 0.05 |
| KC KCl | 0.05 | $MgSO_4 \cdot 7H_2O$ | 0.05 |
| $MgSO_4 \cdot 7H_2O$ | 0.05 | $FeSO_4 \cdot 7H_2O$ | 0.001 |
| $FeSO_4 \cdot 7H_2O$ | 0.001 | | |
| Urea | 0.4 | $(NH_4)_2SO_4$ | 0.8 |
| $K_2HPO_4$ | 0.1 | $CaCO_3$ | 0.5 |
| KCl | 0.05 | $K_2HPO_4$ | 0.1 |
| $MgSO_4 \cdot 7H_2O$ | 0.05 | KCl | 0.05 |
| $FeSO_4 \cdot 7H_2O$ | 0.001 | $MgSO_4 \cdot 7H_2O$ | 0.05 |
| | | $FeSO_4 \cdot 7H_2O$ | 0.001 |

The fermentation is conducted under aerobic conditions such as a shake culture, or aeration-agitation of a submerged culture. The shake culture is first conducted and subsequently can be changed to a stationary culture. The pH of the culture medium is 6–9 and the temperature of culturing is 20° to 40° C. The culturing period of time is usually 24 to 72 hours and a significant amount of isoamylase is accumulated in the culture medium. After the completion of culturing, the whole cultured liquor as it is may be used as an enzyme solution and the enzyme in and outside the cells can be thus completely utilized, or said liquor may be used after the cells are filtered off, or as shown in the examples, ammonium sulfate-salting out of the culture filtrate, adsorption to calcium phosphate gel and further purification by diethylamino ethyl (DEAE) cellulose column chromatography may be conducted.

Examples of the present invention are shown hereunder. However, they are only illustrative and the present invention should not be limited thereto. Various modifications of this invention can be made without departing from the spirit or scope thereof.

EXAMPLE 1

*Escherichia intermedia* (ATCC No. 21073) was used as a seed microorganism. Said microorganism previously seed-cultured in the culture medium containing 0.5% by wt. of maltose, 1% by wt. of peptone, 1% by wt. of meat extract and 0.5% by wt. of $NaNO_3$ was inoculated in the fermentation medium at the rate of 5% (by volume). The fermentation medium of the following composition was used and the shake culture was conducted at 30° C.

Composition of the fermentation medium: 5% (by wt.) dextrin, 1% by wt. of peptone, 0.5% by wt. of $K_2HPO_4$, 0.05% by wt. of $MgSO_4 \cdot 7H_2O$, 0.05% by wt. of KCl, 0.001% by wt. of $FeSO_4 \cdot 7H_2O$, and 0.5% by wt. of $NaNO_3$. pH was adjusted to 7.5 before sterilization. The fermentation medium cultured for 48 hours showed 11.1 units of isoamylase activity. Enzymatic activity was measured as follows: 1 ml. of 0.5 N acetate buffer solution at pH 6.0 is added to 5 ml. of a 1% aqueous solution of soluble glutinous rice starch prepared by Lindner's method and 1 ml. of the enzyme solution is added thereto. The solution is left to stand at 40° C. for one hour. To 1 ml. of the solution are added 1 ml. of a 0.01 N iodine potassium iodide solution and water to make the total amount 25 ml. The extinction coefficient at 620 m$\mu$ is measured. As a control, the extinction coefficient of the solution at the beginning was measured. The increase of extinction coefficient was proportional to the amount of enzyme if it was in the range of about 0.1. Under these conditions, the enzyme amount to show 0.1 of the increase of extinction coefficient was provided for 10 units.

The filtrate obtained by removing cells from the fermentation medium was salted out with an aqueous ammonium sulfate solution (0.15–0.45 saturation) according to the conventional method. Re-salting out with an aqueous ammonium sulfate solution (0.18–0.40 saturation) was conducted. Subsequently, said solution was adsorbed to calcium phosphate and moreover, purified by DEAE cellulose column chromatography. The specific activity thereof showed about 100 times increase.

The activities and recovery ratios in each step are determined as shown hereunder.

In determination of the activity, if 1 ml. of an enzyme solution is ued for the reaction, the amount of the enzyme which shows 0.1 of the increase of extinction coefficient is represented as follows:

10 $\mu$/ml. of enzyme solution

Therefore, the specific activity is calculated by dividing the above value with the number of milligrams of the protein in 1 ml. of the enzyme solution, since a pure enzyme is protein, and the purity of the enzyme in the purification steps can be shown by this activity.

| | Total volume (ml.) | Total activity (units) | Specific activity | Recovery rate (percent) |
|---|---|---|---|---|
| Supernatant solution of broth | 3,000 | 33,000 | 0.88 | 100 |
| Salting out I | 230 | 26,730 | 14.2 | 81 |
| Salting out II | 50 | 23,100 | 18.1 | 70 |
| Ca-phosphate gel | 21 | 11,500 | 53.0 | 35 |
| DEAE cellulose | 10 | 6,600 | [1] 99 | 22 |

[1] Increased about 112 times.

$$\text{Specific activity} = \frac{\text{Total activity (units)}}{\text{Total protein (mg)}}.$$

This purified enzyme showed about 47° C. of optimum temperature and about 6.0 of optimum pH. Moreover, the present enzyme reacted with $\beta$-limit dextrin from glycogen. It was recognized to be isoamylase.

EXAMPLE 2

The same fermentation as in Example 1 was conducted, except that the shake culture was first conducted and after 10 hours' of culturing, it was changed to a stationary culture with or without the addition of a 0.1% by wt. of toluene to the culture medium. The fermentation medium showed 7.8 units of isoamylase activity in 24 hours after the beginning of culturing.

What is claimed is:

1. A method for producing isoamylase by fermentation which comprises culturing *Escherichia intermedia* ATCC 21073 in a suitable nutrient culture medium containing at least a source of carbon, and a source of nitrogen at a temperature of 20° to 40° C. and a pH of 6 to 9, accumulating isoamylase in the resultant culture liquor, and recovering the isoamylase therefrom.

References Cited

Natake et al., Agricultural and Biological Chemistry, vol. 28, No. 8, pp. 505–509, 1964.

LIONEL M. SHAPIRO, Primary Examiner